Figure 1:
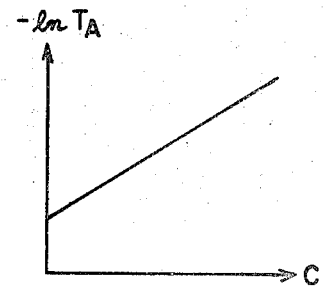

United States Patent                                                  [11] 3,551,678

[72] Inventor  Richard L. Mitchell
                Rochester, N.Y.
[21] Appl. No. 615,422
[22] Filed     Feb. 13, 1967
[45] Patented  Dec. 29, 1970
[73] Assignee  Sybron Corporation
               Rochester, N.Y.
               a corporation of New York

[54] PAPER PARAMETER MEASUREMENT USING
     INFRARED RADIATION
     21 Claims, 7 Drawing Figs.
[52] U.S. Cl...................................................... 250/83.3,
                                         250/43.5, 250/219; 356/51
[51] Int. Cl......................................................G01n 21/18
[50] Field of Search............................................250/83.3IR,
                          83.3D, 219DF, 43.5D; 88/14, 14.5

[56]              References Cited
              UNITED STATES PATENTS
3,122,227  2/1964  Brookout et al............. 88/14CNT(X)
3,205,355  9/1965  Ehlert............................ 250/83.3IR
3,228,282  1/1966  Barker, Jr...................... 250/83.3D(X)
3,405,268  10/1968 Brunton ........................ 250/83.3I

*Primary Examiner*—Archie R. Borchelt
*Assistant Examiner*—Morton J. Frome
*Attorneys*—Peter J. Young, Jr. and Joseph C. MacKenzie ABSTRACT: Infrared radiation at $1.935\mu$, $2.11\mu$ and $1.8\mu$ is passed through paper. The ratio of $1.935\mu$ radiation intensity to $1.8\mu$ intensity, after passage through the paper, and the ratio of $2.11\mu$ radiation intensity to $1.8\mu$ intensity, after passage through the paper, are determined. A mathematical expression is proposed relating these ratios and moisture content. The expression, base on the Lambert-Beer equation, gives moisture content as the logarithm of the former ratio modified by two other terms, each a function of the latter ratio. Tests of many papers to determine the numerical values of said functions, indicates that the one function is the slope of a straight line fitted to a plot of the negative of the logarithm of the said former ratio versus moisture content, that the other is the intercept of that straight line with the logarithm axis, and that a plot of slope versus ratio for these papers defines a single exponential curve from which, given a measurement of the ratio, the slope for almost any paper can be predicted closely. A corresponding plot of intercept versus ratio defines a single exponential curve from which the intercept for almost any paper can be predicted. In general, all paper parameters that might affect the measurement appear to be accounted for by these functions.

PATENTED DEC 29 1970　　　　　　　　　　　　　3,551,678

PAPER PARAMETER MEASUREMENT USING INFRARED RADIATION

This application discloses subject matter disclosed and claimed in application Ser. No. 638,494, filed May 15, 1967, now U.S. Pat. No. 3,514,700, by Richard L. Mitchell and Walter Kalin entitled "System Including Automatic Gain Control for Division and Related Purposes," assigned to the assignee of the present invention.

Figure 2:
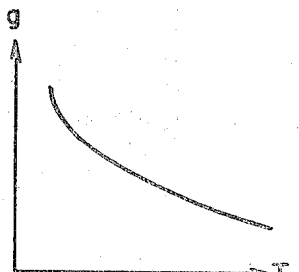
Figure 3:
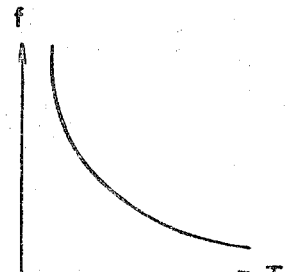
Figure 4:
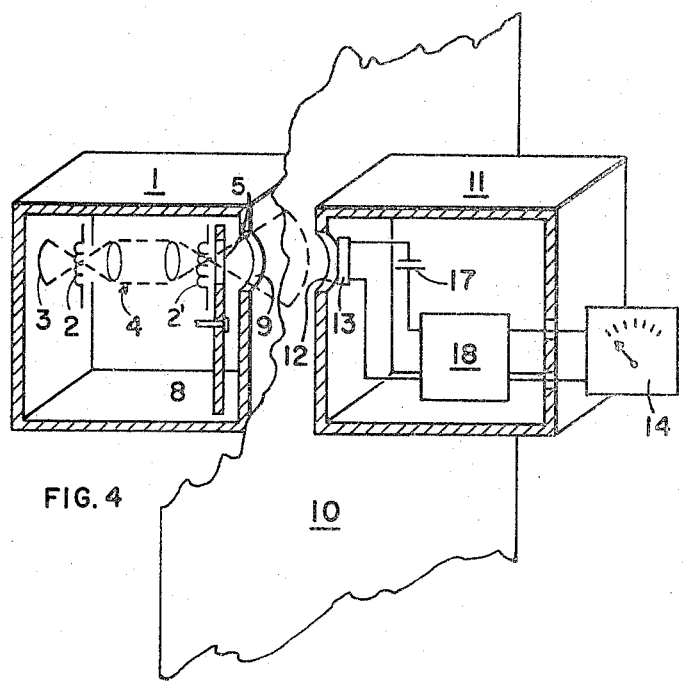
Figure 7:
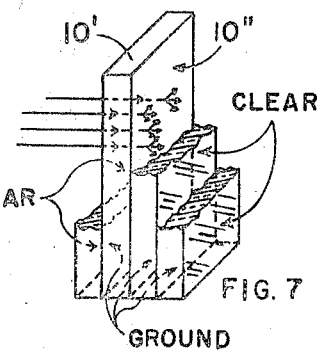
Figure 5:
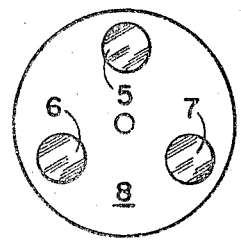
Figure 6:
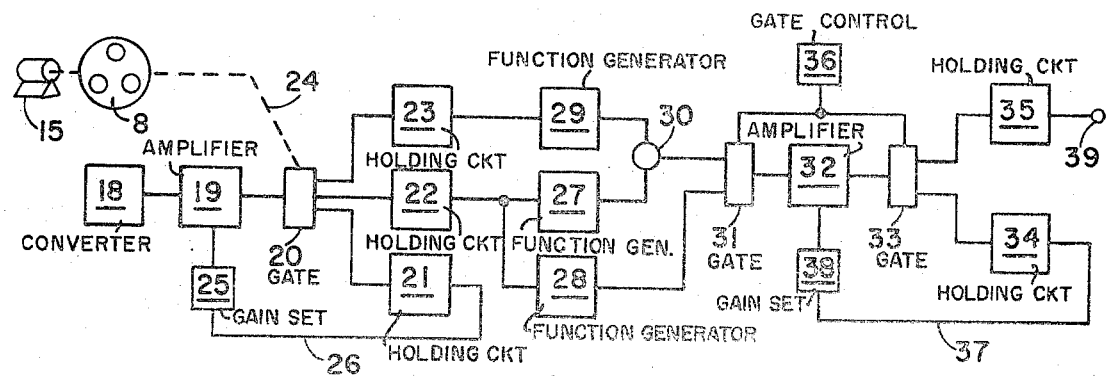

In the drawings, FIGS. 1, 2 and 3 illustrate principles of the invention; FIG. 4 shows measurement of moisture content in accordance with the invention; FIG. 5 shows a detail of FIG. 4; FIG. 6 shows a system particularly adapted for use in measuring and/or controlling moisture content automatically in accordance with the invention; FIG. 7 shows a standardizing element in accordance with the invention.

The present invention provides for measuring a given parameter of material by use of electromagnetic (EM) radiation where several parameters of the material affect said radiation, and is particularly useful in measuring said given parameter in a material wherein the basic composition, form and quantity of the material are parameters which affect the radiation, but from which the given parameter must be distinguished.

Most particularly, the invention is peculiarly adapted for measuring moisture content of paper and like materials. The predominant constituent of paper is cellulose in the form of wood or other fibers whose natural form and substance has been altered mechanically and/or chemically and which are held together mainly by direct molecular bonding between cellulose molecules. Bonding is sometimes reinforced by an adhesive impregnant of the fibrous structure, and a mechanical intertwining of fibers, and friction, also contribute a little to holding the fibers together.

Moisture (that is, liquid water) is also generally present in the fibrous structure, and various of an enormous range of other substances usually may be found impregnating the fibrous structure and/or coating the paper surface. These structural and compositional characteristics affect radiation, determine the functional properties of the end product of the paper manufacturing process, and are varied in manufacturing to obtain the practically numberless variety of papers.

When a beam of radiation is projected on paper, or on a material of analogous structure and composition, a number of interactions between the material and the radiation will occur.

In paper, a ray of radiation may find a path from one side of the paper to the other wherein no fiber of the paper is in the way. Another ray will strike one or more fibers and be reflected in various directions, and may or may not emerge from one side of the paper or another. Other radiation will be absorbed by cellulose molecules, whereas still others will pass right through cellulose molecules. Again, other substances, if in or on the paper will variously scatter, absorb and/or transmit radiation.

It is obvious, therefore, that measurement of the moisture content of paper by radiation techniques may pose great problems. Thus, one may suppose that moisture content of a particular kind of paper could be made by comparing its effect on radiation with that of the same kind of paper having known moisture content. One might further suppose that an apparatus could be built and calibrated on a series of samples of a given kind of paper, of known moisture content, and used thereafter to measure moisture content of that kind of paper without actually making comparison. However, one could also expect the apparatus to be unreliable should the paper being used differ from the calibrating samples only by so little as thickness (caliper, as it is termed, in the paper manufacturing art).

The prior art has proposed measurement techniques designed to ameliorate the sort of problem inherent in the rather naive measuring approach indicated above. Thus, it is attempted to compensate for the effect of basis weight. Also, the scattering effect of paper is very much dependent on paper structure and composition. However, insofar as I know, the prior art does not account for variation of the scattering effect. In short, prior art measurement of moisture content is still bound to paper type or "furnish," i.e., must be recalibrated if the paper to be measured is not the same kind as the apparatus was calibrated on.

My invention utilizes infrared (IR) radiation to make paper moisture content measurements that are substantially independent of the other radiation-affecting characteristics described supra. Once apparatus according to the invention has been calibrated, then moisture content of substantially any paper whatsoever can be measured without recalibrating the apparatus as shown by actual test of hundreds of different kinds of papers.

From one point of view, the essence of the invention may be said to be in the discovery that substantially all papers affect radiation in accordance with a mathematical expression based on the Lambert-Beer equation, an giving moisture content as a specific function of simple radiation intensity measurements, yet taking into account all paper properties that might adversely affect measurement of the moisture in the paper by radiation.

Supposing radiation at certain wavelengths to be projected on the paper, and the intensity of this radiation to be measured after striking the paper, say the net transmission through the thickness of the paper, it appears that the following expression based on the Lambert-Beer equation applied:

$$C = \frac{-\ln T_A - f(\Delta\sigma, X)}{g(\Delta\alpha, X)} \qquad (1)$$

where:
- $C$ = moisture content.
- $T_A$ = the ratio of the intensity of radiation of wavelength absorbed by moisture to a reference wavelength whose absorption by water is small compared to absorption, by water, of the former wavelength
- $x$ = effective length of the path traversed by the radiation.
- $\Delta\alpha$ = difference between the absorption coefficients of water for the two wavelengths
- $\Delta\sigma$ = difference between the scattering coefficients of the radiation path for the two wavelengths Equation (1) is actually based on writing the Lambert-Beer equation for each wavelength and combining the resulting two expressions. The term $\ln$ stands for "natural logarithm of," and $f$ an $g$ stand for "function of." C represents that fraction of the irradiated paper portion which is moisture.

The function $g$ may be taken as approximately simply $\alpha x$, if absorption of the reference beam by moisture is small enough, whereas the functional relation indicated by $f$ is considerably more complex. Moreover, the effective length of path $x$ cannot be taken as merely the thickness of the paper. Finally, theoretical considerations do not suggest any way of expressing either $x$ or $f$ and $g$ as conveniently measurable quantities.

However, through empirical studies I have discovered that expression (1) is a straight line for practically all papers, and that $f$ is the value of $(-\ln T_A)$ for zero moisture content and $g$ is the value of the slope of the straight line. I have further discoverd that both $f$ and $g$ can be determined by measuring $T_R$, wherein $T_R$ is the ratio of the intensity of a beam of wavelength such as to be absorbed by cellulose but not by water, to the intensity of the beam at the reference wavelength used in determining $T_A$. And finally, I have discovered that it is not necessary to evaluate $f$ and $g$ for all papers. That is, the numerical values of $f$ are determined for a representative variety and number of papers, are plotted against $T_R$, as measured, for those papers, and a continuous curve is then fitted to the plot. With rare exceptions, a measurement of the $T_R$ of any other paper suffices to predict the $f$ of that paper from the said curve to within 5 percent of what the measured value of $f$ would be. In the same fashion, measured values of $g$ and $T_R$ are plotted for representative papers, and a curve is fitted to the plot, thus providing for predicting g for practically all other papers, but to 1 percent accuracy, not 5 percent.

This universality of $f$ and $g$ is quite surprising, especially considering the multitude of variations in paper raw material processing, form and composition that can affect radiation. Yet though the paper be made of sulfate, sulfite, semichemical, groundwood stock, or mixtures thereof; whether it be of low, medium or high freeness; whether it be dyed, sized, filled, resin-coated, emulsion-coated, calendared, tissue, kraft, text, stationary, etc., seems to make no difference. The rare exceptions are sufficiently few, that when identified, it is practical to provide a special calibration for them, with the exception of carbon paper wherein the heavy carbon coating, not unexpectedly, makes the basic measuring concept inapplicable.

The application of the above is to moisture content measurement in the range of 0–10 percent of oven dry weight which, generally speaking, is the range of interest in manufacturing or processing paper. Accuracy over this range (with repeatability of 0.1 percent) is from 2.5 percent to 5 percent thereof, the higher accuracy obtaining in part of this range (about half) and being locatable by calibration, at any desired position in the whole range. The accepted paper industry standard—TAPPI method T412—gives no better results.

FIGS. 1, 2 and 3 represent graphically the relations described above where the beams wavelengths are $1.935\mu$, $2.11\mu$ and $1.8\mu$, which are water-absorbed, cellulose-absorbed, and not absorbed by either water or cellulose, respectively. Also, the rationale of the invention contemplates that $1.935\mu$ is not absorbed by cellulose, $2.11\mu$ is not absorbed by moisture, and $1.8\mu$ is not absorbed by anything in or on the paper. In practice, the difference between absorbed and not absorbed need only be relative, and the radiation beams need not be monochromatic. Where the beams are obtained by means of narrow band pass filters, the beams are bands of radiation at wavelengths more or less centered on the nominal wavelengths of the filters.

In fact, cellulose absorbs the $2.11\mu$ beam only about twice as strongly as it does either the $1.935\mu$ beam or the $1.8\mu$ beam. Again, water absorbs the $1.935\mu$ beam about 10 times as strongly as it does the $2.11\mu$ beam, and about 20 times as strongly as it does the $1.8\mu$ beam.

Insofar as scattering is concerned, all the beams are scattered by the paper, which assures that empirically determined $f$ accounts for scattering. It appears that the beams need not be scattered equally. Also, in general, all constituents that may be found in paper (other than cellulose and moisture) should absorb the three wavelengths equally, which appears to be substantially the case with the specific wavelengths disclosed herein.

For the recited wavelengths, then, equation (1) becomes $$C = \frac{-ln(I_{1.935}/I_{1.8}) - f(I_{2.11}/I_{1.8})}{g(I_{2.11}/I_{1.8})} \quad (2)$$

where:

$$\frac{I_{1.935}}{I_{1.8}} = T_A, \quad \frac{I_{2.11}}{I_{1.8}} = T_R$$

each $I$ represents intensity after passage through the paper of the beam having a wavelength in microns as given by its subscript, and the other symbols are as before The $2.11\mu$ beam may be replaced by a $1.3\mu$ beam or a $2.225\mu$ beam, as with these three, $T_R$'s are nearly linearly related. However, $T_R$ as first defined is more sensitive to the paper parameters accounted for by $f$ and $g$ than the other two versions of $T_R$.

The foregoing is a description of a novel method for measuring moisture content, and would enable one skilled in the art to practice the method without use of more than ordinary skill. FIG. 4, however, illustrates structural aspects of my invention.

In FIG. 4, a housing 1 mounts an infrared source, such as an electrically-heated filament 2. A concave mirror 3 and lenses defining a light condenser 4, provide for projecting radiation, whose envelope is shown in dashed line, on a band pass filter 5, which with two other filters 6 and 7, is mounted on a revolvable flat wheel 8 (FIG. 5). The wheel is rotated by means not shown in FIG. 4 to present the filters 5, 6 and 7 successively to the beam of radiation from condenser 4.

Preferably, the filament has a broad radiant area and it, the mirror 3, and condenser 4 are located so that the filament is imaged on the surface of filter 5, as indicated at 2'.

Housing 1 has a window 9 through which the radiation irradiates a paper sheet 10 whose plane is maintained approximately normal to the plane of the drawing and to the optical axis of the lens and mirror system. The paper is shown partly torn away for clarity.

The radiation striking the paper 10 is variously absorbed and scattered by the paper, and it will be evident that the side of the paper away from window 9 provides a broad area, diffuse source of such radiation from window 9 as can get through the paper. A substantial portion of this radiation passes through a window 12 of a housing 11, which is designed to exclude radiation except as received via window 12, and irradiate the radiation sensitive surface of a radiation detector 13, typically a lead sulfide cell, or the like, having spectral sensitivity for the radiation of the bands passed by filters 5, 6 and 7. The two housings 1 and 11 are located sufficiently close together as to keep the radiation of the environment of the housings at a little-fluctuating, low value. The interior of housing 11 is blackened and otherwise arranged so that the detector 13 receives only the direct radiation of paper 10.

The detector 13, of course, undergoes a change in some electrical property in response to radiation striking its sensitive area, hence, a suitable instrument 14 is provided for measuring the said electrical property, such measurement serving as a measure of the intensity of radiation incident on the detector's sensitive area.

Accordingly, by interposing filters 5, 6 and 7 in the radiation from condenser 4, a beam whose spectral content is the pass band of the filter is caused to irradiate the paper 10, and instrument 14 provides a measurement of the intensity of that beam as affected by the paper. Similarly, by then interposing filters 6 and 7 successively in the condenser radiation, corresponding beams traverse the paper, and instrument 14 provides measures of their intensities after passage through the paper. Accordingly, by choosing the filters 5, 6 and 7 to have band passes of respectively to $1.8\mu$, $2.11\mu$ and $1.935\mu$ or equivalent band passes, three measurements of intensity are obtained from which $T_A$ and $T_R$ can be computed. Knowing $T_A$ and $T_R$, the natural logarithm of the former can be found, and the latter can be used to choose values of $f$ and $g$ from plots like FIGS. 2 and 3, whereby equation (1) can be solved for C, since all the numerical values for the right-hand side thereof are now known.

Measuring apparatus, generally speaking, has to be calibrated. In the present case, this includes determining functions $f$ and $g$ empirically, which in turn basically involves measurements of $T_A$ and $T_R$ for paper samples of known moisture content. However, as a practical matter, $T_A$ and $T_R$ are not readily reproducible from one actual apparatus to the next. My conclusions as to the universality of $T_A$ and $T_R$ are based on studies using spectrophotometric apparatus by means of which the spectral content of the various beams could be more or less made to order, so to speak, by suitable adjustments of the apparatus. Such apparatus, however, does not usually lend itself well to use outside the laboratory, and there the practice is generally to approximate the ideal of monochromatic beams or of beams of precisely-specifiable spectral content in a given pass band.

Thus, the spectral content of the beam from a practical $1.8\mu$ filter may be expected to differ from that of a beam from an apparently identical $1.8\mu$ filter.

Accordingly, calibration of an actual apparatus according to the invention, using filters to obtain the specified beams, includes, in effect, determining $f$ and $g$ with the same filters as will be used when measuring moisture content. This calibration, however, is once and for all, unless filter-replacement occurs, in which case recalibration will likely be required. It should be noted that removal of filters, as for cleaning, may adversely affect calibration unless reinstalled in the same position as they had before removal.

The foregoing is to be distinguished from standardization. In the present invention, standardization is on a sandwich of ordinary ground glass panes, as shown in FIG. 7 (all but one pane being broken away for clarity in depicting the effect of a ground surface on radiation). In use, the glass sandwich is positioned in the radiation path instead of the paper, and acts as if it were a piece of paper free of both cellulose and moisture, insofar as absorption of radiation is concerned, but retaining scattering properties. Thus, FIG. 7 depicts radiation striking the left surface of a piece of ground glass 10', passing therethrough without loss due to absorption till it strikes its ground right surface 10" which scatters the radiation in varied directions. The apparatus used in measuring the output of detector 13 should be adjusted so that $T_A$ and $T_R$ have some suitable predetermined value when measured with the glass 10' in place. Preferably, each of $T_A$ and $T_R$ is taken as unity. All measurements thereafter on paper relative to these standard values of $T_A$ and $T_R$, as $f$ and $g$ will have been determined with the apparatus adjusted to give $T_A$ and $T_R$ unity, when the glass 10' is in place.

Standardization, as opposed to calibration, provides for compensating for changes in properties of the apparatus due to temperature, etc. Thus, changes in filament temperature may alter the intensity of one or more beams, but will not otherwise affect the spectral content of the beam. Thus, if the intensities of the $1.8\mu$ and $1.935\mu$ beams decrease for such reason, then the $T_R$ measurement will require in effect that measurements of $T_R$ be multiplied by a factor equal to unity divided by $T_R$ measured with glass 10'. That is, supposing $T_R$ to have been standardized previously, then after filament temperature change, $T_R$ will not be unity for glass 10', but rather some value representative of the reduced intensity of the $1.8\mu$ beam, which value, when divided into one, gives the necessary correction for filament temperature change. $T_A$ is not likely to be much affected, since both its numerator and denominator reflect the filament temperature change. Since measurement is self-canceling ratios, influences on beam intensities and/or their measurement affecting all beams and/or measurements alike will create mainly self-canceling errors. Only filter replacement may be expected to require recalibration, effects of other disturbing factors, in general, being neutralized by standardization.

The requirements for ground glass 10' are mainly that it be dry and equally transparent to the radiation beams used. Ordinary ground glass is suitable, and it only need be large enough in ground area that radiation illuminates as much ground area as it normally does paper area. In practice, up to seven ⅛-inch thick glass panes are stacked or sandwiched together, as shown, so that the end panes present their unground sides to view, to make it easier to keep the stack clean. The number of panes is not critical, but in order to make the same standardizing element do for all papers to be tested, it should have enough ground surfaces that it is equivalent in scattering ability to a paper of medium scattering ability. Glass panes ground on both surfaces could be used.

It is to be observed that one part of the basic problem is to distinguish water in the presence of scattering and absorption by the structure containing the water, and in the presence of other substances in the structure. The particular water-absorbed wavelength specified herein operates to do so up to more than 10 percent moisture by weight in the thickest grades of paper. The main limitation is due to the fact that it is necessary to use radiation intensity at a level high enough to get measurable amounts through the paper, but without appreciably heating the paper such as to change its moisture content. The thicker the paper and the greater the moisture content, the more the radiation becomes absorbed. Such limitation can sometimes be eased by choice of wavelengths. In the present case, for example, $1.45\mu$ is absorbed by water like $1.935\mu$ but not as strongly, and could replace the latter.

Paper 10 can shift back or forth along the radiation path about three-eighths of an inch without adversely affecting the measurement. The composition of the atmosphere likely to be found about the paper: water vapor, carbon dioxide, dust, etc., likewise does not influence the measurement. Deposition of atmosphere-borne radiation-attenuating materials other than moisture, in general, can be compensated for by periodic cleaning and/or restandardization.

The invention as described is not limited to the range of zero to 10 percent moisture content. This range is merely one in which the described accuracy is obtained. Such accuracy is not always needed; hence, I do not consider range a limiting factor of my invention.

Other materials closely resemble paper in their radiation-affecting properties. Thus, cotton cloth differs mainly in that it relies on mainly mechanical interlock for maintaining its form. Again, many foodstuffs such as vegetables, are cellulosic, and in general, foodstuffs of all kinds are basically compounds of carbon, hydrogen and oxygen resembling cellulose. Since in foodstuffs, baking dough, for example, the moisture content is an important parameter, I believe my invention would be applicable thereto for the purpose of measuring moisture content. It is to be noted that my invention is not gradient-sensitive, that is to say, the distribution of water along the direction of the radiation beam (and for that matter, distribution or location of other additives, along the beam) does not affect the measurement, which in essence, is the measurement of total moisture contained in a volume of material corresponding to the area thereof "seen" by the detector.

FIGS. 4 and 5 show paper 10 as a portion of a generally more or less endless web moving through the space between the housings at speeds up to hundreds of feet per minute with respect to which it is desirable to provide a more or less continuous automatic measurement of moisture content as the paper moves along. It is, of course, possible to measure moisture in a discrete piece of paper, using the invention as disclosed here. Again, while FIG. 4 was described in terms of measurement, at a fixed location on the moving paper, it would also be possible to measure the gradient of moisture content from side to side of the paper by moving the measuring apparatus in the corresponding direction, that is, transverse to paper motion which, as the drawing suggests, is along the vertical of the FIG.

It is also possible to incorporate my invention in a system wherein the measurement is performed automatically, in order to obtain the measurement in a form that can be more or less continuously used to provide indication, recording and/or control of moisture content of the paper web. FIG. 6 exemplifies such a system. Referring first to FIG. 4, suppose detector 13 to be a lead sulfide cell. In such case, a source of current 17 would be provided in series therewith whereby variations in radiation striking the sensitive area of the cell would modulate the current through the cell due to battery 17. Ordinarily, suitable circuitry represented by box 18 would be provided to convert cell current (which is small and subject to interference) to a corresponding voltage or current at relatively high level and to provide an output impedance more suitable for use in a system such as shown in FIG. 6. (These peculiarities of radiation detecting and suitable expedients for dealing therewith are well-known in the prior art.)

According to FIG. 6, the output signal of circuitry 18, preferably a DC voltage corresponding to the detector resistance, is applied first to an amplifier 19, and thence, via a gate 20, to holding circuits 21, 22 and 23. Gate 20 is under control of disc 8, which operates suitable gate control means symbolized by a dashed line 24.

In a typical case in practice disc 8 is rotated at a uniform rate of 80 revolutions per minute. Hence, in each revolution, each filter is in the radiation path for part of a 25 millisecond interval. The dimensions of disc and filters and the radial and angular positions of the filters are such that in each revolution not more than one filter is wholly or partly in the path of the radiation in a continuous interval of 25 milliseconds of revolution. Hence, gate control means 24 is constructed to control gate 20 in synchronism with the disc 8 so that in one 25 millisecond interval, gate 20 passes voltage to holding circuit 21 only; in the next such interval, to holding circuit 22 only; in the next such interval, to holding circuit 23 only, and such that in each such interval only one filter affects the output of detector 13. Supposing the filters to have passed in 5, 6 and 7 order, then holding circuit 21 receives voltage affected by filter 5 only, circuit 22 receives voltage affected by filter 6 only, and holding circuit 23 receives voltage affected by filter 7 only. Since disc 8 rotates exactly once in 75 milliseconds, the next revolution of disc 8 repeats the described gating sequence, and so on, as long as disc 8 rotates.

Holding circuits 21, 22 and 23 may be of known construction whose basic design is to charge a capacitor to the magnitude of a voltage applied to the circuit, and which includes suitable means such as an electrometer amplifier which transforms said voltage into a corresponding current or voltage output signal without appreciably discharging the capacitor, which in turn is a good quality, low leakage capacitor that can hold its charge for a sufficient time (on the order of 75 milliseconds, in this case) without substantially dissipating leakage thereof, in the absence of a charging source. In short, each holding circuit is charged (or discharged) to the voltage output of circuitry 18 once for each revolution of disc 8. It will therefore be seen that the voltages held by circuits 21, 22 and 23 are respectively a voltage proportional to the $1.8\mu$ beam, to the $2.11\mu$ beam and to the $1.935\mu$ beam produced by filters 5, 6 and 7, respectively, and attenuated by passage through paper 10.

As one expedient for performing division, the output of holding circuit 21 is fed back to amplifier 19 in such fashion as to set amplifier gain at a value that causes said output to be maintained at a predetermined constant value, as by operating a gain control 26 of amplifier 19, control 26 being adapted to hold amplifier gain at a value always corresponding to the feedback from holding circuit 21. In this way, the voltages held by holding circuits 23 and 22 become proportional to $T_A$ and $T_R$, respectively.

A pair of function generators 27 and 28 each receives the output of holding circuit 22, and are constructed and arranged to convert this output to signals representative of $f$ and $g$, respectively.

A function generator 29 receives the output of holding circuit 23 and converts this output to a signal representative of $1nT_A$.

A summing junction 30 receives the $1nT_A$ signal and the $f$ signal, and is designed to diminish the magnitude of the $1nT_A$ signal by the magnitude of the $f$ signal ($T_A$ is always less than unity so the negative of its logarithm is a positive number). Consequently, junction 30 provides the numerator of equation (2) and the $g$ signal from function generator 28 is, of course, the denominator thereof.

Numerator and denominator signals are applied via a gate 31 to an amplifier 32 which in turn produces corresponding output signals, and via a gate 33, applies them to one or the other of a pair of holding circuits 34 and 35, these last being like holding circuits 21, 22 and 23. Gates 31 and 33 are under control of a gate control means 36 (which may control these gates independently of the control of gate 20). Specifically, gates 31 and 33 are so controlled as (1) to pass the numerator signal to amplifier 32 and the corresponding output of the latter to holding circuit 35. These two gating states are mutually exclusive and are caused to exist alternately, say at a rate of 60 cycles per second.

The output of holding circuit 34 is fed back via a feedback loop 37 to a gain setting means 38 which sets the gain of amplifier 32, in accordance with the manner in which the gain of amplifier 19 is set by feedback from holding circuit 21. Thus, the dividing action by which $T_A$ and $T_R$ were obtained now provides C, as given in equation (2), in the form of the output from holding circuit 35, available at the output 39 of holding circuit 35, and to which output there may be connected a recorder, meter, controller, alarm or the like conventional entity useful in the control and/or indication, etc., of the moisture content of the paper 10.

FIG. 6 is, of course, not the only way of automating the invention. The diagrammatically-shown and functionally-described circuit entities are well-known individually for the functions described; hence, it is unnecessary to describe them in any detail. Preferably, solid state circuitry is utilized throughout. The system, in some cases, may be simplified by eliminating function generator $f$, for $f$ is often small in comparison to $(-1n \ T_A)$ and $g$. Again, $f$ may in some cases be taken as a fixed value on the average, and provided for in the design of the remaining circuitry. Generally speaking, the system will include a number of operational useful whose feedback, input and etc., other circuitry provide for adjusting the levels of and functional relationships among the various voltages and currents appearing in the systems. Such adjustments provide for those few exceptional papers referred to previously, because in practice, it is found that these papers can be provided for by simply shifting the level of the outputs of generators $f$ and $g$ up or down and/or right or left, as if these special papers belonged to a class having $f$ and $g$ curves like the general run of papers, but oriented differently with respect to the axes of FIGS. 2 and 3.

The aforesaid adjustment capabilities also provide for standardization. For example, one might periodically check the operation of the system by inserting glass 10' in place of paper 10, and determine whether the outputs of holding circuits 22 and 23 were equivalent to $T_A$ and $T_R$ each equal to unity, and, if necessary, adjust one or another component of the system to correct any deviation from unity.

The foregoing disclosure will suffice one skilled in the art to construct and use same without exercise of more than ordinary skill in the art. While I have indicated a likely theoretical basis for the invention, its usefulness and practice is independent of the aptness and correctness of theory, for whatever be the case with the latter, it is a fact that practically all known varieties of paper whose effect on IR radiation can be measured in accordance with the principles set forth herein, can have their moisture content measured to the standards indicated, and without requiring recalibration for variation in paper type in any particular application of my invention.

I claim:

1. A system for measuring a meter of a predominantly single-constituent material, said system including a source of beams of EM radiation of different wavelengths for passage along a path including said material, a beam-intensity detector in said path, and means operable by said detector in accordance with beam-intensity for deriving a measurement of said parameter; and said system also including the improvement wherein said source provides first, second and third beams of EM radiation, said first beam being of wavelength absorbed by said parameter, said second beam being of wavelength absorbed by said constituent, but not by said parameter relative to absorption of said first beam by said parameter, said third beam being of wavelength not absorbed by said parameter nor by other parameters, including said constituent, and the said three beams each being attenuated by scattering in said material.

2. The system of claim 1, wherein said source provides said first, second and third beams with wavelengths of substantially $1.935\mu$, $2.11\mu$ and $1.8\mu$, respectively.

3. The system of claim 1, wherein said means includes means for measuring the ratio of the intensity of said first beam to the intensity of said third beam, means for measuring the ratio of the intensity of said second beam to the intensity of said third beam, and means for converting said ratios into a measurement of said parameter.

4. The method of measuring moisture content of predominantly cellulosic material, comprising:
providing a sample of said material;
passing first, second and third EM beams through said sample;
measuring the ratio of the intensity of said first EM beam to the intensity of said third EM beam and the ratio of the intensity of said second EM beam to the intensity of said third EM beam, after all said beams have passed through aid said sample; and
computing said moisture content as a function of the said ratios; said first EM beam being of wavelength strongly absorbed by moisture; said second EM beam being of wavelength strongly absorbed by cellulose, but not by moisture relative to absorption of said first EM beam by moisture; said third EM beam being not strongly absorbed by moisture or by any parameter of said material strongly absorbing said second EM beam; and all three said EM beams being attenuated by scattering in said material.

5. The method of claim 4, wherein said first, second and third EM beams are respectively and substantially $1.935\mu$, $2.11\mu$ and $1.8\mu$ in wavelength.

6. The method of measuring moisture content of predominantly single-constituent material, comprising:
providing a sample of said material;
passing first, second and third EM beams through said sample;
measuring the ratio of the intensity of said first EM beam to the intensity of said third EM beam and the ratio of the intensity of said second EM beam to the intensity of said third EM beam, after all said beams have passed through said sample; and
computing said moisture content as a function of the said ratios; said first EM beam being of wavelength strongly absorbed by moisture; said second EM beam being of wavelength strongly absorbed by said constituent, but not by moisture relative to absorption of said first EM beam by moisture; said third EM beam being not strongly absorbed by moisture or by any parameter of said material strongly absorbing said second EM beam; and all three said EM beams being attenuated by scattering in said material.

7. The method of claim 6, wherein said first, second and third EM beams are respectively and substantially $1.935\mu$, $2.11\mu$ and $1.8\mu$ in wavelength.

8. The method of measuring moisture content of predominantly cellulosic material, comprising providing a sample of said material, passing first and second EM beams through said sample, measuring the ratio between the intensity of first EM beam and the intensity of said second EM beam, after said beams have passed through said sample, and computing the logarithm of a said ratio as a measure of said moisture content, said first EM beam being of wavelength strongly absorbed by moisture; said second EM beam being not strongly absorbed by moisture or by any parameter of said material strongly absorbing said second EM beam; said method also comprising passing a third beam through said sample, measuring the ratio between the intensity of said third EM beam and the intensity of said second EM beam, and computing said measure by dividing said logarithm by a factor representing absorption by cellulose of said third beam and being a function of the last said ratio; and all three said beams being attenuated by scattering said material.

9. The method of claim 8, wherein said first, second and third beams are respectively $1.935\mu$, $1.8\mu$ and $2.11\mu$ in wavelength.

10. The method of claim 8, comprising computing said measure by subtracting a factor representing scattering from said logarithm, the last said factor being a function of said last said ratio; and all three said beams being attenuated by scattering in said material.

11. The method of claim 10, wherein said first, second and third beams are respectively $1.935\mu$, $1.8\mu$ and $2.11\mu$ in wavelength.

12. The method of measuring moisture content of predominantly single-constituent material, comprising providing a sample of said material, passing first and second EM beams through a said sample, measuring the ratio between the intensity of said first EM beam and the intensity of said second EM beam, after said beams have passed through said sample, and computing the logarithm of a said ratio as a measure of said moisture content, a said first EM beam being of wavelength strongly absorbed by moisture; said second EM beam being not strongly absorbed by moisture or by any parameter of said material strongly absorbing said second EM beam; said method also comprising passing a third beam through said sample, measuring the ratio between the intensity of said third EM beam and the intensity of said second EM beam, and computing said measure by dividing said logarithm by a factor representing absorption by said single-constituent of said third beam and being a function of the last said ratio; and all three beams being attenuated by scattering in said material.

13. The method of claim 12, wherein said first, second and third beams are respectively $1.935\mu$, $1.8\mu$ and $2.11\mu$ in wavelength.

14. The method of claim 12, comprising computing said measure by subtracting a factor representing scattering from said logarithm, the last said factor being a function of said last said ratio; and all three said beams being attenuated by scattering in said material.

15. The method of claim 14, wherein said first, second and third beams are respectively $1.935\mu$, $1.8\mu$ and $2.11\mu$ in wavelength.

16. The method of measuring a parameter of predominantly single-constituent material, comprising:
providing a sample of said material;
projecting first, second and third beams of EM radiation on said sample for causing the intensities thereof to be influenced by parameters of said material;
measuring the said intensities of said first beam, said second beam and said third beam, after all said beans have been projected on said sample; and
computing a measurement of said parameter as a function of the said intensities; said first beam being of wavelength strongly absorbed by a sad said parameter; said second beam being of wavelength strongly absorbed by said constituent, but not by said parameter relative to absorption of said first beam by said parameter; said third beam being not strongly absorbed by said parameter or by any other parameter of said material strongly absorbing said second beam; and said computing including;
generating a measure of the first said parameter in terms of its concentration in said material, from the intensities of said second and said third beams; and modifying said first said measure by the second said measure for making said measurement in the form of said first said measure effectively unaffected by said another parameter.

17. A system for measuring a parameter of a predominantly single-constituent material, said system including a source of beams of EM radiation of different wavelengths for passage along a path including said material, a beam-intensity detector in said path, and means operable by said detector in accordance with the intensities of said beams attenuated by said material for deriving a measurement of said parameter; said system also including the improvement wherein said beams include a first beam of wavelength absorbed by said parameter, a second beam of wavelength not absorbed by said parameter nor by other parameters, including said constituent, and said means includes means responsive to the said intensities of said first and second beams for providing a measure of the logarithm of the ratio between the said intensity of said first beam and the said intensity of said second beam; said beams of said source including a third beam; the last said means being responsive to the said intensity of said third beam for dividing said measure by a factor representing absorption by said single-constituent, said factor being a function of the ratio between the said intensity of said second beam; said third beam being of wavelength absorbed by said constituent but not by said parameter relative to absorption of said first beam by said parameter.

18. The system of claim 17, wherein said beams are respectively $1.935\mu$, $1.8\mu$ and $2.11\mu$ in wavelength.

19. A system for measuring a parameter of a predominantly single-constituent material, said system including a source of beams of EM radiation of different wavelengths for passage along a path including said material, a beam-intensity detector in said path, and means operable by said detector in accordance with the intensities of said beams attenuated by said material for deriving a measurement of said parameter; said system also including the improvement wherein said beams include a first beam of wavelength not absorbed by said parameter, a second beam of wavelength not absorbed by said parameter nor by other parameters, including said constituent, and said means includes means responsive to the said intensities of said first and second beams for providing a measure of the logarithm of the ratio between the said intensity of said first beam and the said intensity of said second beam; said beams of said source including a third beam; the last said means being responsive to the said it intensity of said third beam for subtracting from said measure a first factor representing scattering by said material, said first factor being a function of the ratio between the said intensity of said third beam and the said intensity of said second beam; the last said means also being responsive to the said intensity of said third beam for dividing the difference between said measure and said first factor by a second factor representing absorption by said single-constituent, said second factor being a function of the ratio between the said intensity of said third beam and the said intensity of said second beam; said third beam being of wavelength absorbed by said constituent but not by said parameter relative to absorption of said first beam by said parameter; and all three said beams being attenuated by scattering in said material.

20. The system of claim 19, wherein said first, second and third beams are respectively $1.935\mu$, $1.8\mu$ and $2.11\mu$ in wavelength.

21. A system for measuring a parameter of a predominantly single-constituent material, said system including a source of beams of EM radiation of different wavelengths for passage along a path including said material, a beam-intensity detector in said path for detecting the intensities of said beams as affected by parameters of said material and means operable by said detector in accordance with said intensities for deriving a measurement of said parameter;

said system also including the improvement wherein said source provides first, second and third beams of EM radiation, said first beam being of wavelength absorbed by said parameter, said second beam being of wavelength absorbed by said constituent, but not by said parameter relative to absorption of said first beam by said parameter, said third beam being of wavelength not absorbed by said parameter nor by other parameters of said material, including said constituent; and said means including first function generating means for generating a measure of said parameter, in terms of its concentration in said material, from said intensities of said first and third beams; second function generating means for generating a measure, of the influence on the first said measure of at least one of said other parameters, from the said intensity of said second beam; and computing means connected to both said function generating means for computing, from both said measures, a measurement of said parameter in the form of said first said measure effectively unaffected by said one of said other parameters.

UNITED STATES PATENT OFFICE
CERTIFICATE OF CORRECTION

Patent No. 3,551,678  Dated  December 29, 1970

Inventor(s)  Richard L. Mitchell

It is certified that error appears in the above-identified patent and that said Letters Patent are hereby corrected as shown below:

Column 2, lines 25 and 30, Equation (1) should appear as shown below:

$$C = \frac{-\ell n T_A - f(\Delta\sigma, X)}{(\Delta\alpha, X)}$$

line 39, the left hand symbol should read -- $\Delta\alpha$ --. line 46, "1" should read -- $\ell n$ --; line 60, the quantity in parenthesis reading "1" should read -- "$\ell$" --. Column 5, line 45, "self-canceling" should read -- of --. Column 7, lines 51, 52 and 53 "$1nT_A$", each occurrence, should read -- $\ell n T_A$ --.

Signed and sealed this 7th day of March 1972.

(SEAL)
Attest:

EDWARD M. FLETCHER, JR.
Attesting Officer

ROBERT GOTTSCHALK
Commissioner of Patent